US009092012B2

(12) United States Patent  (10) Patent No.: US 9,092,012 B2
 Dornhege  (45) Date of Patent: Jul. 28, 2015

(54) COUPLING ASSEMBLY FOR COUPLING A WRISTWORN DEVICE TO A STRAP

(71) Applicant: Timex Group USA, Inc., Middlebury, CT (US)

(72) Inventor: Thomas Dornhege, Pforzheim (DE)

(73) Assignee: Timex Group USA, Inc., Middlebury, CT (US)

( * ) Notice: Subject to any disclaimer, the term of this patent is extended or adjusted under 35 U.S.C. 154(b) by 244 days.

(21) Appl. No.: 13/651,651

(22) Filed: Oct. 15, 2012

(65) Prior Publication Data

US 2014/0101893 A1  Apr. 17, 2014

(51) Int. Cl.
 *A44C 5/14* (2006.01)
 *G04B 37/14* (2006.01)

(52) U.S. Cl.
 CPC ......... *G04B 37/1493* (2013.01); *Y10T 24/1368* (2015.01); *Y10T 24/4782* (2015.01); *Y10T 29/49826* (2015.01)

(58) Field of Classification Search
 CPC .............................. G04B 37/1493; A44C 5/14
 USPC ........... 224/164, 167, 168; 368/282; 403/166; 968/360; 24/3.2, 265 B, 265 WS
 See application file for complete search history.

(56) References Cited

U.S. PATENT DOCUMENTS

| 1,194,484 | A | | 8/1916 | Depollier | |
|---|---|---|---|---|---|
| 1,689,044 | A | * | 10/1928 | Meyer | 16/425 |
| 2,870,511 | A | | 1/1959 | Sand | |
| 2,901,806 | A | | 9/1959 | Henshel | |
| 3,824,783 | A | | 7/1974 | Nadeau | |
| 4,285,450 | A | | 8/1981 | Barnes | |
| 4,564,308 | A | | 1/1986 | Ikegami | |
| 5,483,505 | A | | 1/1996 | Cartier | |
| 6,647,593 | B2 | | 11/2003 | Iguchi | |
| 2014/0250637 | A1 | * | 9/2014 | Stotz | 24/265 B |

* cited by examiner

*Primary Examiner* — Robert J Sandy
*Assistant Examiner* — Michael Lee
(74) *Attorney, Agent, or Firm* — Carmody Torrance Sandak & Hennessey LLP (57) ABSTRACT

A sleeve for use in an assembly for coupling a wristworn device to a first end of a strap. The sleeve has a first end dimensioned to be received in the recess in the inner face of the first lug of a wristworn device, an inner cavity dimensioned to receive therein the first end of a conventional spring bar, and a retractor coupled to the sleeve for urging the first end of the spring bar towards the second end of the spring bar. The second end of the spring bar is coupled to the second lug, the spring bar is coupled to the strap, the first end of the spring bar is positioned in the inner cavity of the sleeve and the first end of the sleeve is coupled to the first lug. A removable retractor for use with a spring bar, which allows for the use of a plurality of spring bars and therefore, lends itself to widespread use and retrofitting of an assembly that couples a strap to a wristworn device, is also provided.

7 Claims, 8 Drawing Sheets

COUPLING ASSEMBLY FOR COUPLING A WRISTWORN DEVICE TO A STRAP

BACKGROUND OF THE INVENTION

The present invention is directed generally to coupling assemblies for coupling a wristworn device to a strap, and in particular, to a sleeve that is designed to fit over a spring bar, conventional or otherwise, and facilitate the removal and attachment of the strap to the wristworn device. In a preferred embodiment, the wristworn device is a wristwatch but as will be understood from the disclosure herein, the invention is not so limiting.

Constructions that attempt to facilitate a user's ability to couple and decouple the wristwatch to/from the strap are well known. For example, one known solution has spring bars where a pin is radially fixed on one of the two axially movable spring-loaded pins and the radial pin protrudes through a slot of the tube of the spring bar. The watchband/strap has a longitudinal slot allowing the radial pin of the spring bar to protrude and allow for manual movement within the longitudinal slot of the strap until the strap can be disassembled from the watchcase. Some other prior art constructions are described in U.S. Pat. Nos. 1,194,484; 2,870,511; 2,901,806; 3,824,783; 4,285,450; 4,564,308; 5,483,505 and 6,647,593. However, all of the foregoing constructions have perceived deficiencies.

It is thus believed that further advances to the state of the art are both desirable and achievable. In particular, it is desirable to provide users with an ability to more easily couple and decouple a strap to and from a wearable device, such as wristwatch by way of example. Accordingly, constructions and methodologies for attachment in accordance with the present invention are set forth herein.

SUMMARY AND OBJECTIVES OF THE INVENTION

It is thus an objective of the present invention to overcome the perceived deficiencies in the prior art.

Specifically, it is an objective of the present invention to provide constructions that facilitate the changing of a strap with a wristworn device as well as the coupling and decoupling between the device and the strap.

Another objective of the present invention is to provide constructions that permit a user to more easily change a strap for the wristworn device without using tools or having special knowledge of the spring bar construction.

Still another objective of the present invention is to provide constructions, such as a sleeve or a removable ring, which can be used with a plurality of spring bars and therefore, lends itself to widespread use and retrofitting of the assembly that couples a strap to a wristworn device.

Still a further objective of the present invention is to provide methodologies for carrying out and/or facilitating the foregoing.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

Therefore, and generally speaking, in accordance with a first preferred embodiment, the invention is directed to an assembly for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap, wherein the assembly comprises a spring bar comprising a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar; a sleeve, the sleeve comprising a first end dimensioned to be received in the recess in the inner face of the first lug, and an inner cavity dimensioned to receive therein the first end of the spring bar; and a retractor coupled to the sleeve for urging the first end of the spring bar towards the second end of the spring bar; wherein when (i) the second end of the spring bar is positioned in the recess in the inner face of the second lug, (ii) the spring bar is coupled to the strap, and (iii) the first end of the spring bar is positioned in the recess in the inner face of the first lug, the wristworn device is coupled to the strap without the use of the sleeve; and when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and wherein, the first end of the spring bar and the first end of the sleeve are not simultaneously positioned in the recess in the inner face of the first lug.

In accordance with a second preferred embodiment, the invention is directed to an assembly for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap, wherein the assembly comprises a spring bar comprising: a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar; a sleeve, the sleeve comprising a first end dimensioned to be received in the recess in the inner face of the first lug, and an inner cavity dimensioned to receive therein the first end of the spring bar; and a retractor coupled to the sleeve for urging the first end of the spring bar towards the second end of the spring bar; wherein when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and wherein the first end of the spring bar and the first end of the sleeve are not simultaneously positioned in the recess in the inner face of the first lug.

In accordance with yet another preferred embodiment, the invention is directed to a sleeve for use in an assembly for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap and comprises a spring bar comprising a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar, wherein the sleeve comprises a first end dimensioned to be received in the recess in the inner face of the first lug, and an inner cavity dimensioned to receive therein the first end of the spring bar; and a retractor coupled to the sleeve for urging the first end of the spring bar towards the second end of the spring bar; wherein when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and wherein, the first end of the spring bar and the first end of the sleeve are not simultaneously positioned in the recess in the inner face of the first lug.

In yet another preferred embodiment, the invention is directed to a method of retrofitting the coupling arrangement of a wristworn device and strap with a sleeve comprising a first end and an inner cavity, wherein the wristworn device comprises a first lug and a second lug spaced from the first lug, wherein the first lug includes a recess in an inner face thereof and the second lug includes a recess in an inner face thereof, and wherein the coupling arrangement comprises a spring bar comprising (i) a first end positioned in the recess in the inner face of the first lug, (ii) a second end positioned in the recess in the inner face of the second lug, and (iii) a biasing member for permitting the first end of the spring bar to be biased towards and away from the second end of the spring bar, wherein the method comprises the steps of placing the first end of the spring bar into the inner cavity of the sleeve; positioning the second end of the spring bar in the recess in the inner face of the second lug; and positioning the first end of the sleeve in the recess in the inner face of the first lug; wherein the sleeve further comprises a retractor for urging the first end of the spring bar towards the second end of the spring bar; wherein: when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and wherein, the first end of the spring bar and the first end of the sleeve are not simultaneously positioned in the recess in the inner face of the first lug.

In accordance with yet another preferred embodiment, an assembly for coupling a wristworn device to a first end of a strap is provided. In this embodiment, again, the wristworn device preferably comprises a first lug and a second lug spaced from the first lug, wherein the first lug includes a recess in an inner face thereof and the second lug includes a recess in an inner face thereof, and wherein the assembly is coupleable to the first end of the strap, and in this preferred embodiment, the assembly comprises a spring bar comprising a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar; and a retractor, the retractor being removably coupled to the first end of the spring bar, the retractor being engagable for urging the first end of the spring bar towards the second end of the spring bar; whereby when the second end of the spring bar is positioned in the recess in the inner face of the second lug and the first end of the spring bar is positioned in the recess in the inner face of the first lug, engaging the retractor with a user's finger(s) so as to urge the first end of the spring bar toward second end of the spring bar causes the first end of the spring bar out of the recess of the inner face of the first lug.

In yet another preferred embodiment an assembly for coupling a wristworn device to a first end of a strap is provided, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap, wherein the assembly comprises a spring bar comprising a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar; a sleeve, the sleeve comprising an inner cavity dimensioned at a first end to initially receive the first end of the spring bar, and a second end out of which the first end of the spring bar extends, wherein when the spring bar is positioned in the sleeve, the second end of the spring bar extends outwardly of the first end of the sleeve; and a retractor for urging the first end of the spring bar towards the second end of the spring bar; wherein when the second end of the spring bar is positioned in the recess in the inner face of the second lug, and the first end of the spring bar is positioned in the recess in the inner face of the first lug; the retracting of the retractor causes the first end of the spring bar to disengage from the recess in the inner face of the first lug; whereby the assembly is disengaged from between the first and second lugs.

In yet another preferred embodiment, a method of retrofitting an assembly for coupling a wristworn device and a strap is provided, wherein the wristworn device comprises a first lug and a second lug spaced from the first lug, wherein the first lug includes a recess in an inner face thereof and the second lug includes a recess in an inner face thereof, and wherein the assembly comprises a spring bar comprising (i) a first end positioned in the recess in the inner face of the first lug, (ii) a second end positioned in the recess in the inner face of the second lug, and (iii) a biasing member for permitting the first end of the spring bar to be biased towards and away from the second end of the spring bar, wherein the method comprises the steps of removing the spring bar from between the first and second lugs; placing the first end of the spring bar into an inner cavity of a sleeve and causing the first end of the spring bar to emerge out of a second end of the sleeve; coupling the strap to the assembly; placing the second end of the spring bar in the recess in the inner face of the second lug, urging the first end of the spring bar towards the second end of the spring bar by applying pressure against a retractor on the sleeve; aligning the first end of the spring bar with the recess in the inner face of the first lug; and releasing the pressure against the retractor; wherein the spring bar is reinserted between the first and second lugs.

In a preferred embodiment, the wristworn device is a timepiece in the form of a wristwatch.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Figure 1:
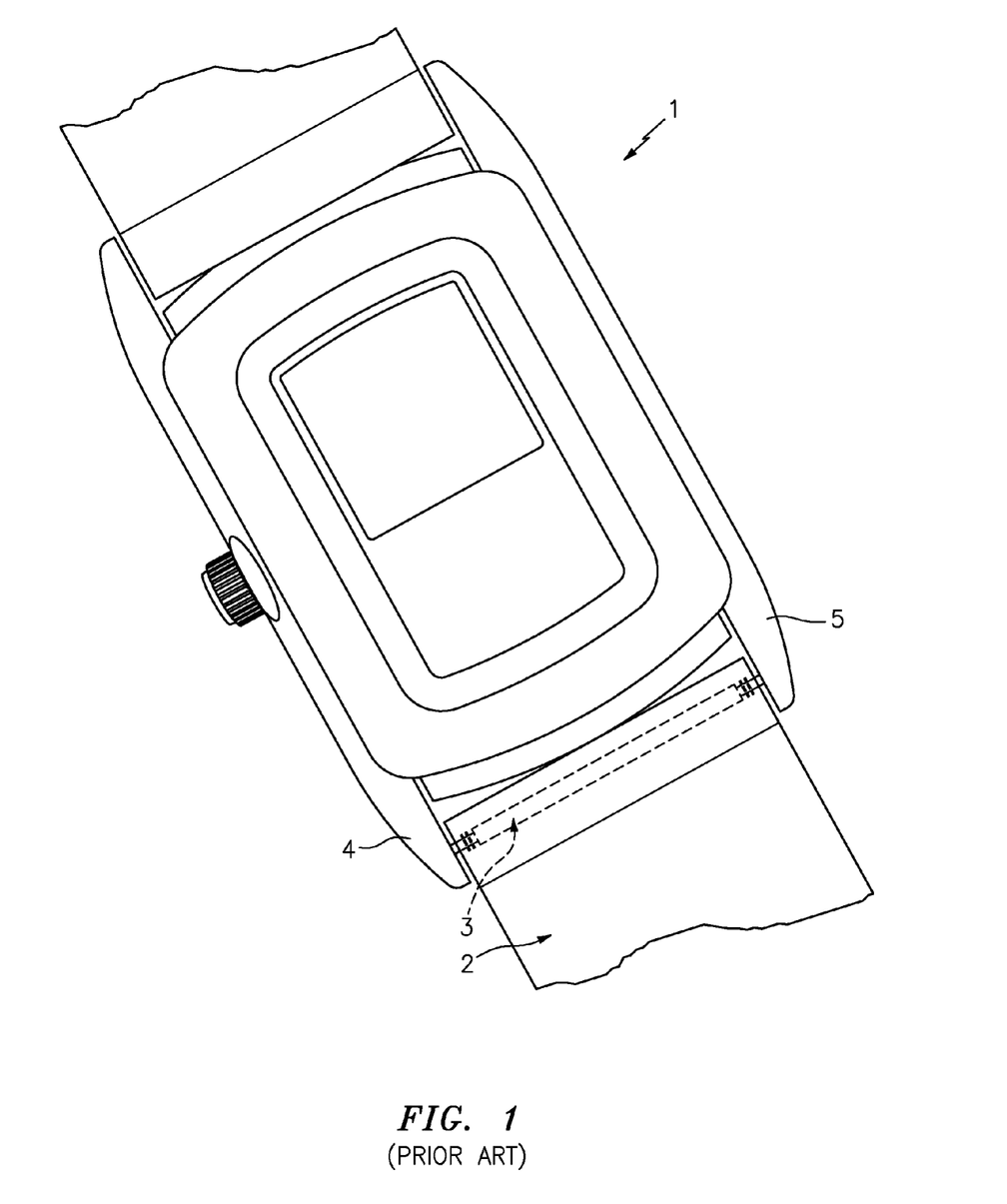
FIG. 1 illustrates a conventional wristworn device and conventional strap in accordance with the prior art.

Reference is first made to FIG. 1, which depicts a wristworn device constructed in accordance with the prior art, in the nature of a wristwatch, generally indicated at 1, which is coupled to a conventional strap, generally indicated at 2. FIG. 1 also depicts a conventional spring bar, generally indicated at 3, for coupling the strap to the wristworn device. As would be understood in the art and depicted in FIG. 1, a first end of spring bar 3 is dimensioned to be received in a recess in an inner face of a first lug 4 and a second end of spring bar 3 is dimensioned to be received in a recess in an inner face of a second lug 5. Spring bar 3 preferably includes a biasing member for permitting the first end of the spring bar 3 to be biased towards and away from the second end thereof. A special tool or pin is typically needed to remove spring bar 3 so that strap 2 can be changed or replaced.

Figure 2:
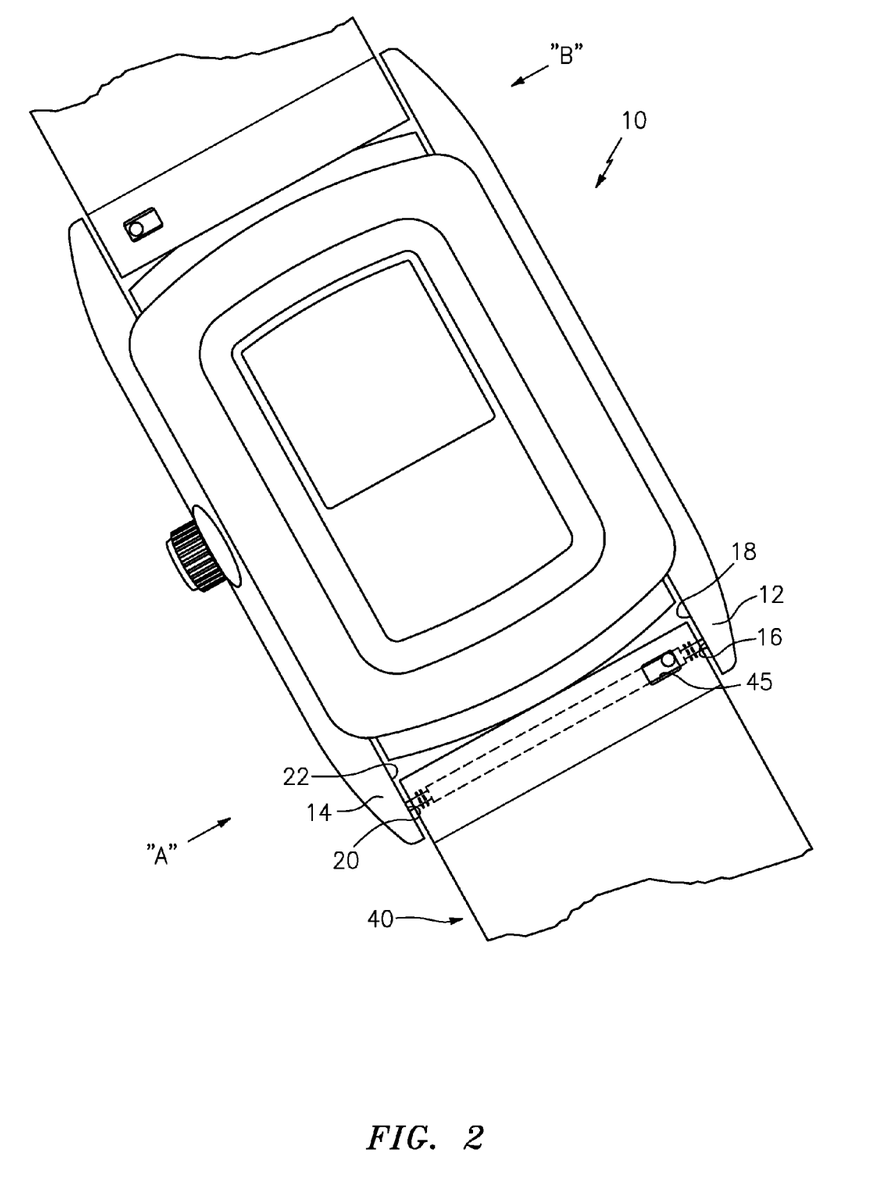
FIG. 2 illustrates an assembly constructed in accordance with a preferred embodiment of the present invention, coupling a conventional strap and wristworn device.

Although the wristworn devices of FIG. 1 and of FIG. 2 are preferably a wristwatch, this is by example and not limitation. That is, the wristworn device for use with the present invention may be in the form of and/or have functionality related to blood pressure, heartrate, altitude, temperature or compass measurements, barometric pressure, (and/or combinations of any of the foregoing), the display of tide information such as whether the tide is high or low, sunset information, moon phases, medical information such as when medicine should be taken and how many pills at each time interval, a count-down timer, or any one of additional parameters such as water pressure, water depth and oxygen left in a diver's tank, object finder, blood/sugar levels (a glucometer); speed and distance (a runner's watch); displaying how much money is in a debit account; and any combination of the foregoing, all of which may be in addition to or in the absence of conventional timekeeping functionality.

Figure 3:
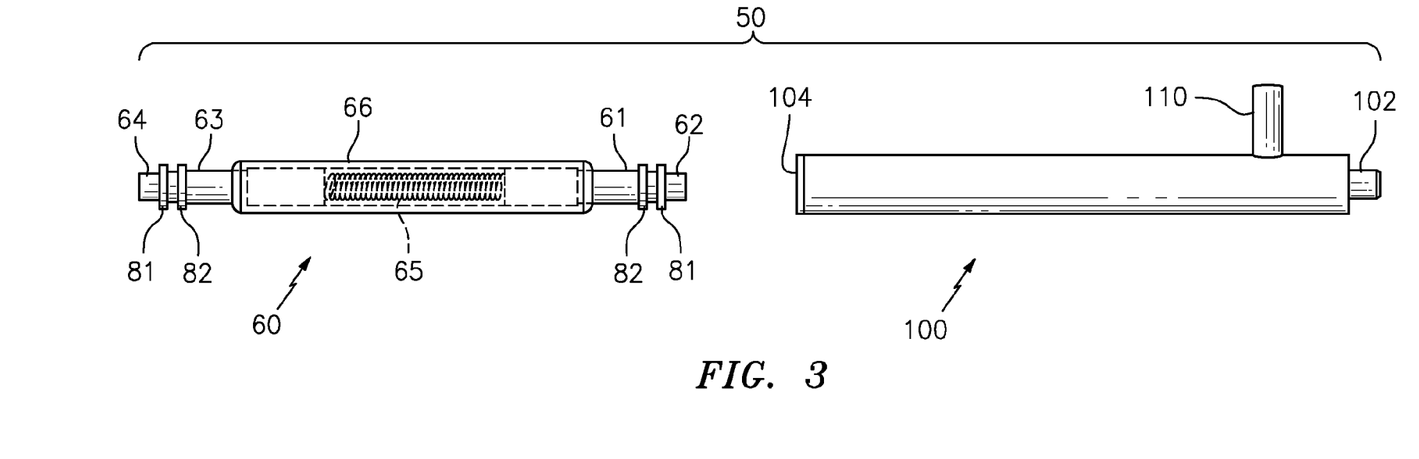
FIGS. 3 and 4 are perspective views of an assembly constructed in accordance with a preferred embodiment of the present invention.
Figure 4:
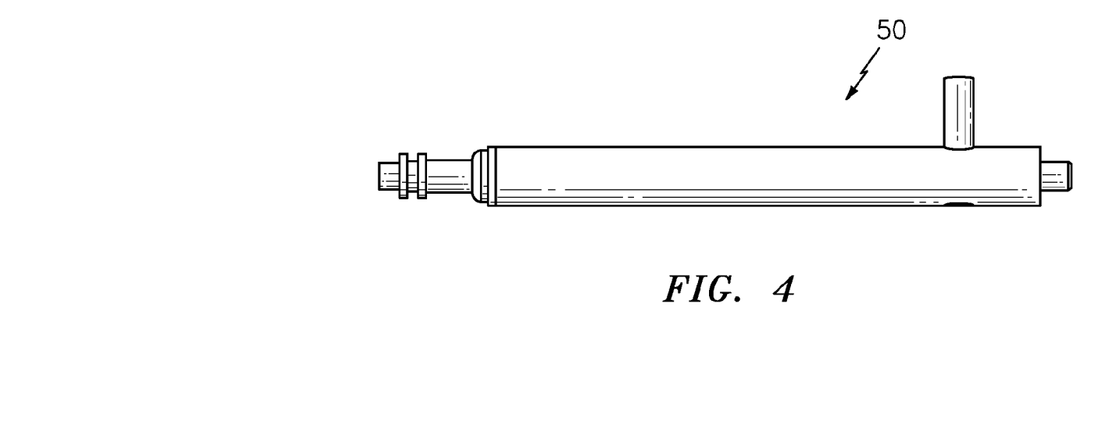
Figure 5:
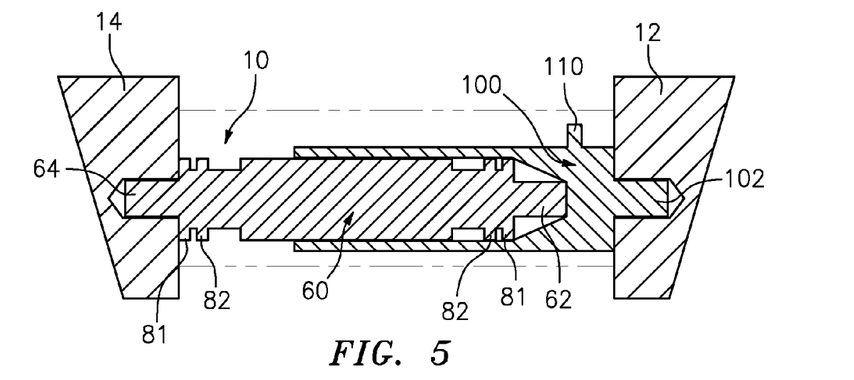
FIG. 5 is a cross-sectional view of the assembly generally, but not necessarily identically, illustrated in FIG. 4 (in FIG. 5, the retractor 110 may only be coupled to an outer surface of sleeve 100)

Reference is next made to FIG. 2, which also depicts a conventional wristworn device, in the nature of a wristwatch, generally indicated at 10, which is coupled to a strap, generally indicated at 40. Strap 40 may be comprised of multiple sections, for example, if a buckle is being utilized or may be of one piece as would be understood in the art. In accordance with a preferred embodiment, each side of the wristworn device (herein designated as "A" and "B") preferably includes an assembly 50 that couples a strap section of strap 40 to the device 10. Assembly 50, constructed in accordance with a first embodiment of the present invention, is disclosed more particularly in FIGS. 3-5.

Turning back to FIG. 2 for a moment, it can be seen that a typical and even conventional wristworn device 10 will preferably have, among other things, a first lug 12 and a second lug 14 spaced from the first lug 12, wherein the first lug includes a recess 16 in an inner face 18 thereof and the second lug 14 includes a recess 20 in an inner face 22 thereof. Coupling the wristworn device 10 and strap 40 together is assembly 50.

Now turning to the particulars of assembly 50, assembly 50 comprises a spring bar, generally indicated at 60, itself having a first member 61 with a first end 62 and a second member 63 with a second end 64 (wherein the end opposite the first end 62 of the first member 61 extends into an outer tube 66), wherein the first end 62 is dimensioned to be received in the recess 16 in the inner face 18 of the first lug 12 and the second end 64 is dimensioned to be received in the recess 20 in the inner face 22 of the second lug 14. Spring bar 60 also includes a biasing member 65, in the form of a spring, for permitting the first end 62 of the spring bar 60 to be biased towards and away from the second end 64. As would be understood, spring bar 60 may be a conventional spring bar as would be well understood in the art.

In accordance with the present invention, a sleeve, generally indicated at 100, is also provided. Sleeve 100 preferably comprises a first end 102 dimensioned to be received in the recess 16 in the inner face 18 of the first lug 12, and an inner cavity 104 dimensioned to receive therein the first end 62 of the spring bar 60 and at least a portion of outer tube 66 of the spring bar 60 (e.g. see FIGS. 4, 5). Sleeve 100 also includes a retractor 110, which is coupled to the sleeve, for urging the first end 62 of the spring bar 60 towards the second end 64 of the spring bar when coupled between lugs 12, 14. Retractor 110 may be in the form of a pin that is soldered, welded, glued, adhered and/or otherwise coupled to the sleeve. For example, retractor 110 may be assembled/coupled to the outer surface of sleeve 100 or retractor 110 may extend through the diameter of sleeve 100 and be adhered to the bottom surface of the sleeve, in a manner exemplary illustrated in FIG. 4. In this way, retractor 110 may also act as a stopper for the continued advancement of end 62 of spring bar 60 within the cavity 104 of sleeve 100. However, this is by example and not limitation.

In this way, when (i) the second end 64 of the spring bar 60 is positioned in the recess 20 in the inner face 22 of the second lug 14, (ii) the spring bar 60 is coupled to the strap 40, and (iii) the first end of the spring bar 62 is positioned in the recess 16 in the inner face 18 of the first lug 12, the wristworn device 10 is coupled to the strap 40 without the use of the sleeve 100

(e.g. see FIG. 1), and when (i) the second end 64 of the spring bar 60 is positioned in the recess 20 in the inner face 22 of the second lug 14, (ii) the spring bar 60 is coupled to the strap 40, (iii) the first end 62 of the spring bar 60 is positioned in the inner cavity 104 of the sleeve 100 and (iv) the first end 102 of the sleeve 100 is positioned in the recess 16 in the inner face 18 of the first lug 12, the wristworn device 10 is also coupled to the strap 40 (see FIG. 2).

However, importantly, it should be clear that the first end 62 of the spring bar 60 and the first end 102 of the sleeve 100 are not simultaneously positioned in the recess 16 in the inner face 18 of the first lug 12. That is, either the spring bar 60 is used alone in accordance with the prior art (e.g. FIG. 1) or the sleeve 100 is also incorporated into assembly 50, which includes spring bar 60, as illustrated and implemented in FIG. 2, in accordance with the present invention.

In a specific embodiment, strap 40 may include a cut-out section 45 so that retractor 110 may extend therethrough and be easily accessible by the fingers of a user's hand.

As can be seen from the foregoing as well as the figures, the present invention provides an improvement over prior art constructions in that the user can more easily change the straps for the wristworn device without using tools or having special knowledge of the spring bar construction. Equally important is the fact that the present invention is constructed to be used in conjunction with a spring bar, conventional or otherwise. As such, the sleeve of the present invention can be used with essentially a plurality of spring bars and therefore, lends itself to widespread use. For example, all a user has to do is slip the spring bar into the sleeve and couple the strap to the wristworn device as illustrated in the figures, by for example, causing the retraction of retractor 110 and inserting (and/or thereafter removing) end 102 from recess 16. If the strap has a cut-out such as cut out 45, then engaging retractor 110 may be further facilitated.

While other attempts have been made to achieve the objectives herein, such attempts have been seen to be, among other things, more expensive and more complicated.

To be sure therefore, a main feature of a preferred embodiment of the present invention is the aforementioned sleeve, which is used in an assembly for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap and comprises a spring bar comprising a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar, wherein the sleeve comprises a first end dimensioned to be received in the recess in the inner face of the first lug, and an inner cavity dimensioned to receive therein the first end of the spring bar; and a retractor coupled to the sleeve for urging the first end of the spring bar towards the second end of the spring bar; wherein when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and wherein, the first end of the spring bar and the first end of the sleeve are not simultaneously positioned in the recess in the inner face of the first lug.

In accordance with another embodiment of the present invention, a method of retrofitting a coupling arrangement of a wristworn device and strap with a sleeve comprising a first end and an inner cavity is provided. Expectedly, the wristworn device comprises a first lug and a second lug spaced from the first lug, wherein the first lug includes a recess in an inner face thereof and the second lug includes a recess in an inner face thereof, and wherein the coupling arrangement comprises a spring bar comprising (i) a first end positioned in the recess in the inner face of the first lug, (ii) a second end positioned in the recess in the inner face of the second lug, and (iii) a biasing member for permitting the first end of the spring her to be biased towards and away from the second end of the spring bar. In accordance with a preferred embodiment, the method comprises the steps of removing the spring bar from between the recess in the inner face of the first lug and the recess in the inner face of the second lug (e.g. FIG. 1); placing the first end of the spring bar into the inner cavity of the sleeve (e.g. FIGS. 3, 4); positioning the second end of the spring bar in the recess in the inner face of the second lug (FIG. 2), and positioning the first end of the sleeve in the recess in the inner face of the first lug (FIG. 2), wherein the sleeve further comprises a retractor for urging the first end of the spring bar towards the second end of the spring bar; wherein: when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and wherein, the first end of the spring bar and the first end of the sleeve are not simultaneously positioned in the recess in the inner face of the first lug.

The method also comprises the step of coupling the assembly to the strap, which may comprise placing the assembly 50 through an elongated aperture in an end of the strap, as illustrated for example in FIGS. 1 and 2, or may comprise other means of coupling which will depend on the construction of the end(s) of the strap that will engage and be coupled to the assembly 50.

In a particular preferred embodiment, the method includes the step of coupling the strap to the assembly prior to either the step of positioning the second end of the spring bar in the recess in the inner face of the second lug or the step of positioning the first end of the sleeve in the recess in the inner face of the first lug, in a specific embodiment, the method comprises performing the following steps in the following order, namely, positioning the second end of the spring bar in the recess in the inner face of the second lug; coupling the strap to the assembly; and positioning the first end of the sleeve in the recess in the inner face of the first lug.

Sleeve 100 is preferably made of metal by conventional stamping and/or other conventional metal shaping techniques.

Reference is now made to FIGS. 6, 6A, 7 and 7A, which are views of conventional spring bars with retractors constructed in accordance with alternative preferred embodiments of the present invention.

Specifically illustrated are conventional spring bars, generally indicated at 80, which function as conventional spring bars, and for the avoidance of doubt, in a manner identical or at least functionally similar to that of spring bar 60 as set forth above. Therefore, the functionality of spring bar 80 shall be omitted for brevity, with the reader being invited (and able) to make reference to spring bar 60 above.

Figure 6:
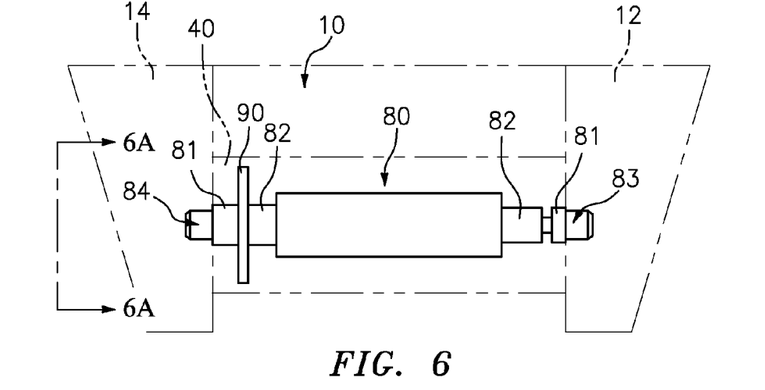
FIG. 6 is a view of a conventional spring bar with a retractor constructed in accordance with an alternative embodiment of the present invention.
Figure 6A:
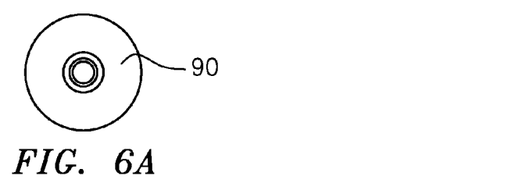
FIG. 6A is a cross-sectional view thereof taken about lines 6A-6A of FIG. 6.
Figure 7:
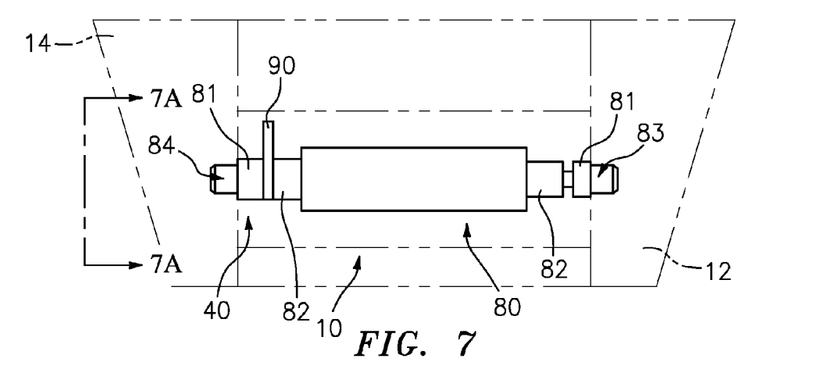
FIG. 7 is a view of a conventional spring bar with a retractor constructed in accordance with a yet a further alternative embodiment of the present invention.
Figure 7A:
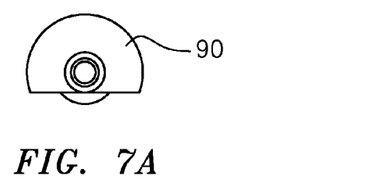
FIG. 7A is a cross-sectional view thereof taken about lines 7A-7A of FIG. 7.

In accordance with the embodiments of FIGS. 6, 6A, 7 and 7A, conventional spring bar 80 is provided with a retractor 90, which may be in the form of for example, a full ring (e.g. FIGS. 6, 6A) or a half-ring (e.g. FIGS. 7 and 7A). Importantly, retractor 90 in both embodiments is removable. In a preferred embodiment, retractor 90, whether a full ring or a half-ring, is preferably positioned between two adjacent rips 81, 82 on either side 83 or 84 of the spring bar 80. When coupled to the spring bar 80 in the manner illustrated in FIGS. 6, 6A, 7 and 7A, retractor 90 likewise facilitates to activate a standard spring bar without a separate tool, whereas a standard spring bar without the proposed retractor 90, whether as a full or half ring, needs to be removed from the watchcase by the use of a tool.

It should thus be seen that the embodiments of FIGS. 6, 6A, 7 and 7A, likewise provide an improved construction that can be used with a plurality of conventional spring bars and therefore, lends itself to widespread use and retrofitting of conventional spring bars with the use of a retractor, such as retractor 90 as illustrated in FIGS. 6, 6A, 7 and 7A.

To be sure therefore, such a preferred embodiment is directed to an assembly for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap, wherein the assembly comprises a spring bar comprising a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar; and a retractor, the retractor being removably coupled to the first end of the spring bar, the retractor being engagable for urging the first end of the spring bar towards the second end of the spring bar; whereby when the second end of the spring bar is positioned in the recess in the inner face of the second lug and the first end of the spring bar is positioned in the recess in the inner face of the first lug, engaging the retractor with a user's finger(s) so as to urge the first end of the spring bar toward second end of the spring bar causes the first end of the spring bar out of the recess of the inner face of the first lug.

The invention is also therefore directed to a retractor for use with a spring bar for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the spring bar is coupleable to the first end of the strap, wherein the spring bar comprising a first end and a second end, wherein the first end is dimensioned to be received in the recess in the inner face of the first lug, and the second end is dimensioned to be received in the recess in the inner face of the second lug, and a biasing member for permitting the first end of the spring bar to be biased towards and away from the second end of the spring bar; and wherein the retractor is removably coupled to the first end of the spring bar, the retractor being engagable for urging the first end of the spring bar towards the second end of the spring bar; whereby when the second end of the spring bar is positioned in the recess in the inner face of the second lug and the first end of the spring bar is positioned in the recess in the inner face of the first lug, engaging the retractor with a user's finger(s) so as to urge the first end of the spring bar toward second end of the spring bar causes the first end of the spring bar out of the recess of the inner face of the first lug.

It is noted that no prior art of which the inventors are aware provide for a removable retractor as disclosed or claimed herein, and therefore, such prior art is devoid of the advantages set forth herein. As but one example, such a removable ring allows for use with a plurality of spring bars and therefore, lends itself to widespread use and retrofitting of an assembly that couples a strap to a wristworn device. Also for the avoidance of doubt, it is clear that at least FIGS. 6 and 7 illustrate the wristworn device itself (i.e. reference number 10), strap 40), first lug 12 and second lug 14 as well as the recesses in the inner faces of the respective lugs.

Figure 8:
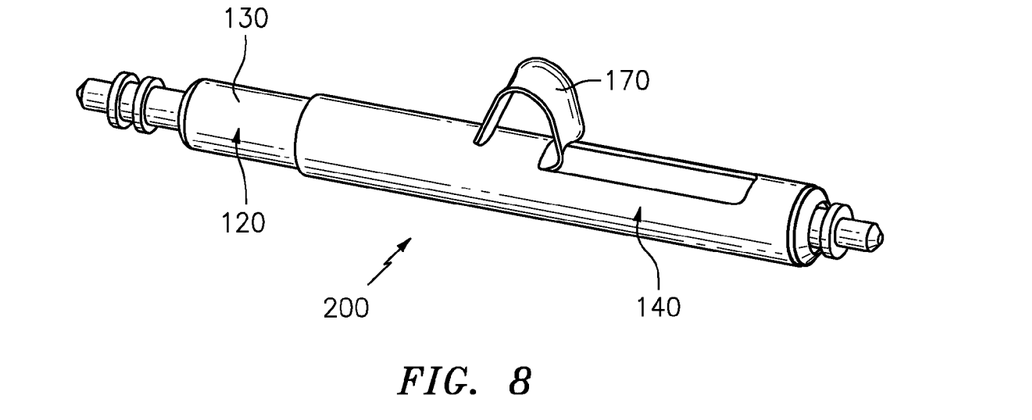
FIG. 8 is a perspective view of an assembly constructed in accordance with a yet another preferred embodiment of the present invention.
Figure 8A:
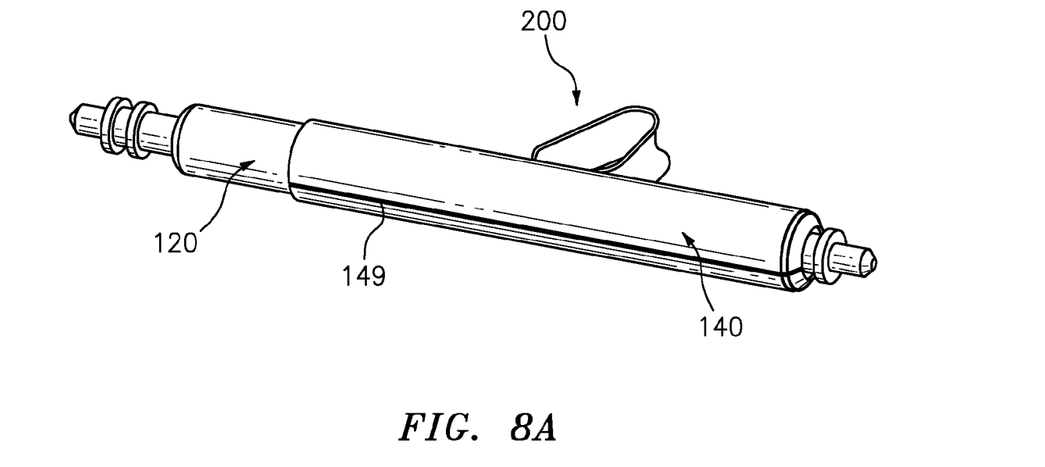
FIG. 8A is another perspective view of the assembly of FIG. 8.
Figure 9A:
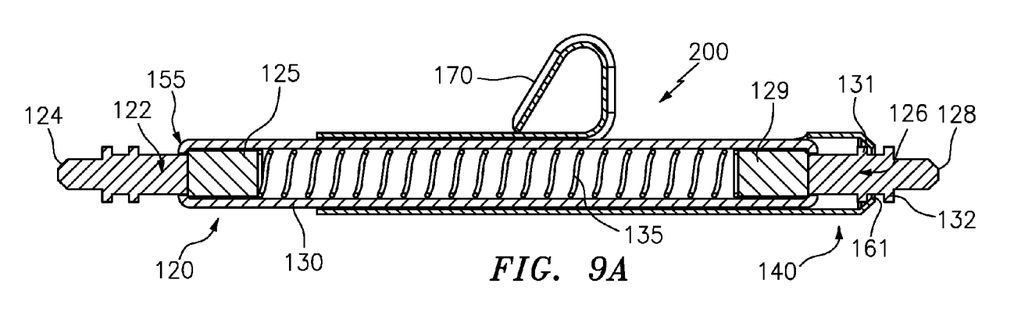
FIGS. 9A, 9B, 9C are cross-sectional views of an assembly constructed in accordance with the embodiment of FIG. 8.

Reference is now made to FIGS. 8, 8A and 9A, which illustrate an assembly, generally indicated at 200, made in accordance with another preferred embodiment of the invention.

Assembly 200 comprises a spring bar, generally indicated at 120, itself having a first member generally indicated at 122 having a first end 124 and a second end 125, and a second member generally indicated at 126 having a first end 128 and a second end 129. Second end 125 and second end 129 extends into an outer tube 130 of spring bar 120. A biasing member 135, in the form of a spring, permits first member 122 and second member 126 to be biased towards and away from each other in a known manner.

As would likewise be understood, assembly 200 is for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap, all as illustrated in FIG. 2 and incorporated by reference into this embodiment.

Figure 10:
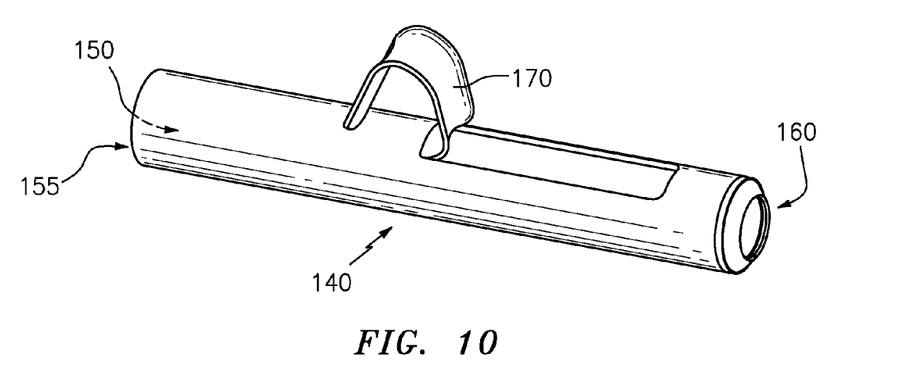
FIG. 10 is a perspective view of the sleeve constructed in accordance with the preferred embodiment of FIG. 8.

To this end, assembly 200 also comprises a sleeve, generally indicated at 140 (also, see FIG. 10). In a preferred embodiment, sleeve 140 comprises an inner cavity 150 dimensioned at a first end 155 to initially receive the first end 128 of the spring bar 120, and a second end 160 out of which the first end 128 of the spring bar 120 extends in the complete construction of assembly 200, wherein when the spring bar 120 is positioned in the sleeve 140, the second end 124 of the spring bar 120 extends outwardly of the first end 155 of the sleeve 150 (e.g. FIG. 8A).

Assembly 200 also includes a retractor 170 for urging the first end 128 of the spring bar 120 towards the second end 124 of the spring bar 120, when for example, the first end of the spring bar is positioned in the recess in the inner face of the first lug and the second end of the spring bar is positioned in the recess in the inner face of the second lug.

Figure 9B:
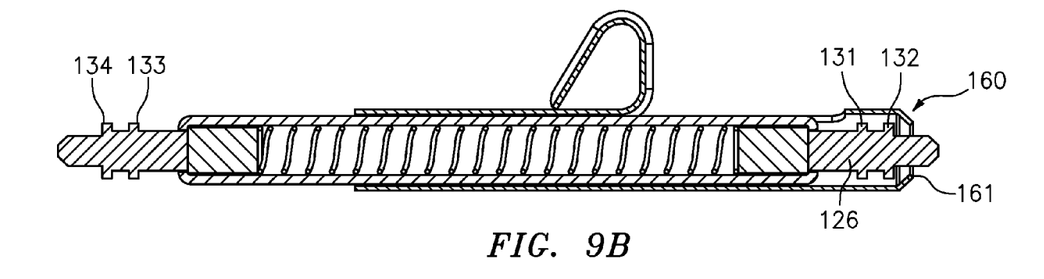

Reference is thus also made briefly to FIG. 9B, which illustrates a different position of first member 126 as it extends outwardly from second end 160 of sleeve 140. For example, FIG. 9B illustrates sleeve 140 with spring bar 120 just prior in time to a first rip 132 being "snapped" over the front edge 161 of the second end 160 of sleeve 140. FIG. 9A illustrates the front edge 161 of sleeve 140 sitting in a cavity formed by the rips 131 and 132.

Figure 11A:
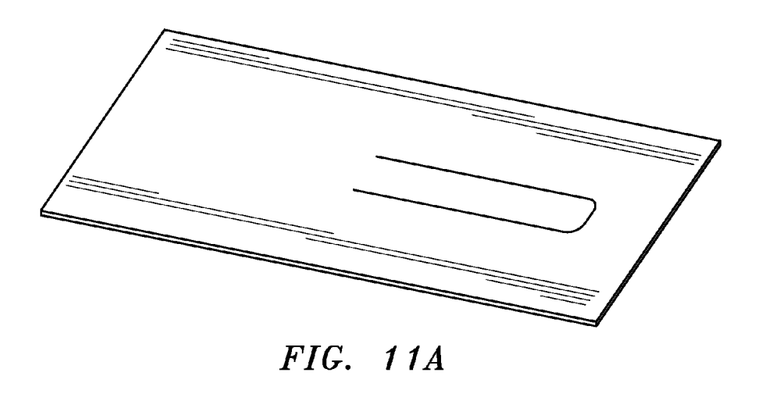
FIGS. 11A, 11B are views of sheet metal that is used to form the sleeves of at least some, if not all, of the embodiments disclosed herein.
Figure 11B:
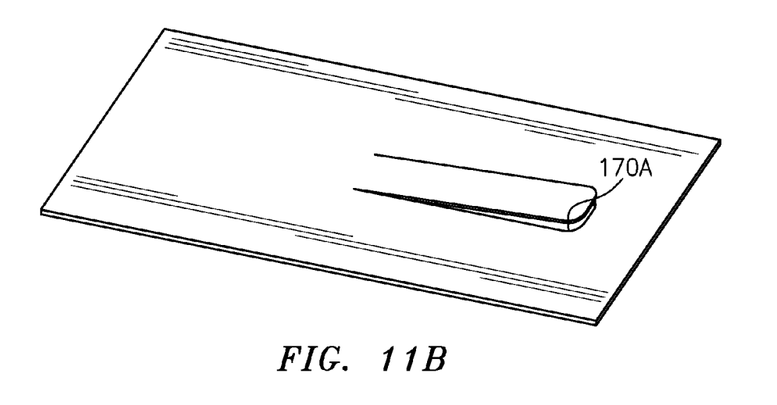

Reference is briefly also made to FIG. 11A, 11B which illustrate sheets of metal in various stages of forming sleeve 140. For example, sleeve 140 is preferably made from a sheet of metal, which is rolled to form the hollow sleeve. After rolling of the metal sheet to form the sleeve, there will be a gap 149 remaining along the length of the sleeve (sec FIG. 8A). Also, preferably, before rolling the metal sheet to form the sleeve, a section (e.g. 170A) is cut in any one of known ways to form what will become retractor 170, preferably positioned on the opposite side of sleeve 140 as the aforementioned gap 149.

There may be more than one desirable positioning of spring bar 120 in sleeve 140. For example, FIG. 9B illustrates rips 132 just prior to snapping over the front edge 161 of the second end 160 of sleeve 140, while FIG. 9C illustrates an embodiment whereby spring bar 120 is just loosely inserted in sleeve 140, which may be advantageous for more easily exchanging and replacing spring bar 120 by a new or different one, all in accordance with the objectives and advantages of the present invention.

Figure 9C:
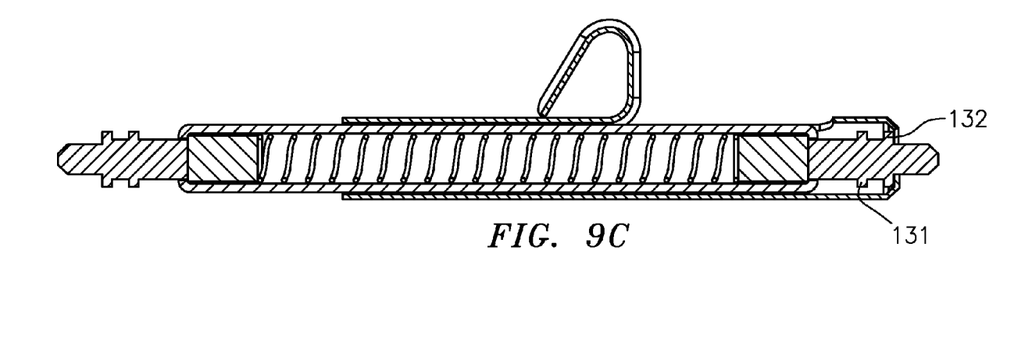
Figures 12A, 12B:
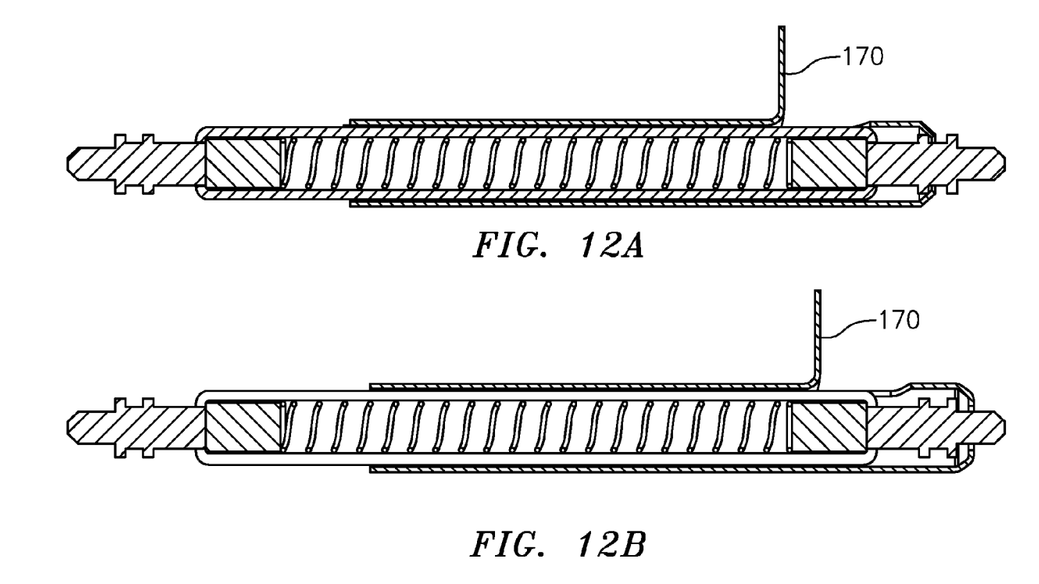
FIGS. 12A, 12B, 12C are cross-sectional views of an assembly constructed in accordance with yet an alternative embodiment of the assembly of claims 9A-9C.
Figure 12C:
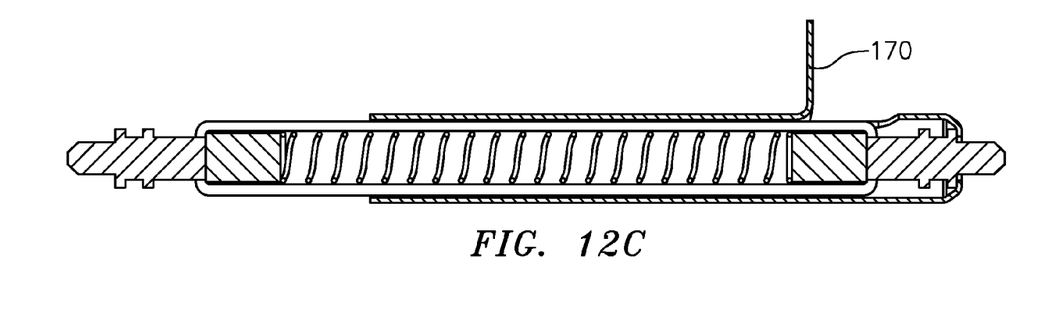

Reference is now briefly made to FIGS. 12A, 12B and 12C, which correspond to and are highly similar to the embodiment(s) illustrated in FIGS. 9A, 9B, 9C, respectively, with the difference being the shape of retractor 170, which can be effectuated by the appropriate cutting in the sheet metal, as should be understood by one skilled in the art. For example, FIGS. 12A-12C illustrate a retractor 170 that is simply a tab, which is formed by a conventional cut in the sheet metal and then bent in such a way, that it just protrudes in a radial direction from the sleeve. This radial retractor 170 can be contrasted with retractor 170 of FIGS. 8 and 10, which provides a more rigid retractor. Where the tab may be cut, extended upwardly and then bent backward down into contact with the surface of the sleeve, thus forming a shape that provides for increased strength and resistance to undesirable bending, distortion or breaking.

To be sure, the embodiment just described is distinguishable from the descriptions set forth in U.S. Pat. No. 2,870,511. For example, in this '511 patent, interchangeability of the spring bar is not possible, for, among reasons, that the L-shaped actuating bar 32, 34 cannot be removed from within housing 12. It is for this reason, that a preferred method of retrofitting an assembly for coupling a wristworn device and a strap is provided, wherein the wristworn device comprises a first lug and a second lug spaced from the first lug, wherein the first lug includes a recess in an inner face thereof and the second lug includes a recess in an inner face thereof, and wherein the assembly comprises a spring bar comprising (i) a first end positioned in the recess in the inner face of the first lug, (ii) second end positioned in the recess in the inner face of the second lug, and (iii) a biasing member for permitting the first end of the spring bar to be biased towards and away from the second end of the spring bar, wherein the method comprises the steps of removing the spring bar from between the first and second lugs; placing the first end of the spring bar into an inner cavity of a sleeve and causing the first end of the spring bar to emerge out a second end of the sleeve; coupling the strap to the assembly; placing the second end of the spring bar in the recess in the inner face of the second lug, urging the first end of the spring bar towards the second end of the spring bar by applying pressure against a retractor on the sleeve; aligning the first end of the spring bar with the recess in the inner face of the first lug; and releasing the pressure against the retractor; wherein the spring bar is reinserted between the first and second lugs.

Thus, the present embodiment provides for a more user friendly construction and methodology to allow for the exchangeability of the spring bar, a feature and advantage not achievable with the present state of the art. Moreover, because of its shape and construction, the present invention provides for the accommodation of different size spring bars, which is not possible with the teachings and descriptions in the '511 patent. The present invention, and the sleeve 140 in particular, can also be more economically manufactured due to the use of progressive tool machines, which permits and facilitates the use of metal bending and stamping operations.

As would now be understood, when the second end of the spring bar is positioned in the recess in the inner face of the second lug, and the first end of the spring bar is positioned in the recess in the inner face of the first lug, the retracting of the retractor causes the first end of the spring bar to disengage from the recess in the inner face of the first lug. In this way, assembly 200 is disengaged from between the first and second lugs, and the watchstrap can be replaced or otherwise removed.

For the avoidance of doubt, the conventional spring bar of all the embodiments may be constructed identically and should be so interpreted.

It can thus be seen that the present invention provides for improved methods and constructions for coupling of a wristworn device to a strap. It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

What is claimed is:

1. An assembly for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap, wherein the assembly comprises:
  a spring bar comprising:
    a first end and a second end, wherein
      the first end is dimensioned to be received in the recess in the inner face of the first lug, and
      the second end is dimensioned to be received in the recess in the inner face of the second lug, and
    a biasing member for permitting the first end of the spring bar to be biased towards and away from the second end of the spring bar;
  a sleeve, the sleeve comprising:
    a first end dimensioned to be received in the recess in the inner face of the first lug, and
    an inner cavity dimensioned to receive therein the first end of the spring bar; and
  a retractor coupled to the sleeve for urging the first end of the spring bar towards the second end of the spring bar;
  wherein:
    when (i) the second end of the spring bar is positioned in the recess in the inner face of the second lug, (ii) the spring bar is coupled to the strap, and (iii) the first end of the spring bar is positioned in the recess in the inner face of the first lug, the wristworn device is coupled to the strap without the use of the sleeve; and
    when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and
  wherein, the first end of the spring bar and the first end of the sleeve are not simultaneously positioned in the recess in the inner face of the first lug.

2. The assembly as claimed in claim 1, wherein the sleeve slides over the first end of the spring bar.

3. An assembly for coupling a wristworn device to a first end of a strap, wherein the wristworn device comprises a first lug and a second lug spaced from the first lug, wherein the first lug includes a recess in an inner face thereof and the second lug includes a recess in an inner face thereof, and wherein the assembly is coupleable to the first end of the strap, wherein the assembly comprises:
  a spring bar comprising:
    a first end and a second end, wherein
      the first end is dimensioned to be received in the recess in the inner face of the first lug, and
      the second end is dimensioned to be received in the recess in the inner face of the second lug, and
    a biasing member for permitting the first end of the spring bar to be biased towards and away from the second end of the spring bar;
  a sleeve, the sleeve comprising:
    a first end dimensioned to be received in the recess in the inner face of the first lug, and
    an inner cavity dimensioned to receive therein the first end of the spring bar; and
  a retractor coupled to the sleeve for urging the first end of the spring bar towards the second end of the spring bar;
  wherein when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and
  wherein the first end of the spring bar and the first end of the sleeve are not simultaneously positioned in the recess in the inner face of the first lug.

4. A method of retrofitting a coupling arrangement of a wristworn device and strap with a sleeve comprising a first end and an inner cavity, wherein the wristworn device comprises a first lug and a second lug spaced from the first lug, wherein the first lug includes a recess in an inner face thereof and the second lug includes a recess in an inner face thereof, and wherein the coupling arrangement comprises a spring bar comprising (i) a first end positioned in the recess in the inner face of the first lug, (ii) a second end positioned in the recess in the inner face of the second lug, and (iii) a biasing member for permitting the first end of the spring bar to be biased towards and away from the second end of the spring bar, wherein the method comprises the steps of:
  placing the first end of the spring bar into the inner cavity of the sleeve;
  positioning the second end of the spring bar in the recess in the inner face of the second lug; and
  positioning the first end of the sleeve in the recess in the inner face of the first lug;
  wherein the sleeve further comprises a retractor for urging the first end of the spring bar towards the second end of the spring bar;
  wherein:
    when (i) the second end of the spring bar is positioned in the recess in the inner face of the second lug, (ii) the spring bar is coupled to the strap, (iii) the first end of the spring bar is positioned in the inner cavity of the sleeve and (iv) the first end of the sleeve is positioned in the recess in the inner face of the first lug, the wristworn device is coupled to the strap; and
  wherein, the first end of the spring bar and the first end of the sleeve are not simultaneously positioned in the recess in the inner face of the first lug.

5. The method as claimed in claim 4, including a first step of removing the spring bar from between the recess in the inner face of the first lug and the recess in the inner face of the second lug.

6. The method as claimed in claim 4, including the step of coupling the strap to the sleeve and spring bar prior to either the step of positioning the second end of the spring bar in the recess in the inner face of the second lug or the step of positioning the first end of the sleeve in the recess in the inner face of the first lug.

7. The method as claimed in claim 6, comprising performing the following steps in the following order, namely,
  positioning the second end of the spring bar in the recess in the inner face of the second lug;
  coupling the strap to the sleeve and spring bar; and
  positioning the first end of the sleeve in the recess in the inner face of the first lug.

* * * * *